United States Patent [19]

Marik et al.

[11] 3,800,073

[45] Mar. 26, 1974

[54] AUTOMATIC HUE CONTROL AND METHOD

[75] Inventors: Charles J. Marik, Chicago; Bernard Shlachter, Morton Grove; William H. Slavik, Palos Hills, all of Ill.

[73] Assignee: Motorola, Inc., Franklin Park, Ill.

[22] Filed: Apr. 3, 1972

[21] Appl. No.: 240,407

[52] U.S. Cl. .......... 178/5.4 HE
[51] Int. Cl. .......... H04n 9/12
[58] Field of Search .......... 178/5.4 HE, 5.4 AC

[56] References Cited

UNITED STATES PATENTS 3,668,306 6/1972 Hansen et al. .......... 178/5.4 HE

*Primary Examiner*—Richard Murray
*Attorney, Agent, or Firm*—Eugene A. Parsons; Vincent J. Rauner

[57] ABSTRACT

In a three-color television receiver utilizing red, blue and green demodulators, variable phase shifting networks are connected to supply to the red and blue demodulators reference signals with predetermined phases relative to the synchronizing signal. An I axis demodulator is utilized to sense a component of color along the I axis and shift the phase of the reference signals to increase the angle between the red and blue chrominance components from the red and blue demodulators when a component is present on the I axis.

11 Claims, 2 Drawing Figures

AUTOMATIC HUE CONTROL AND METHOD

BACKGROUND OF THE INVENTION

1. Field of the Invention

In color television transmitted according to NTSC standards, a synchronizing signal or burst and a chrominance signal are transmitted in a composite television signal. The phase of the chrominance signal relative to the synchronizing signal is critical, since it determines the hue or color ultimately produced in the receiver by the chrominance signal. Because of errors in transmission, caused by faulty equipment, improper adjustment, etc., the phase of the chrominance signal relative to the synchronizing signal will often be improper. These phase errors are most noticeable along the maximum acuity or I axis (reddish orange color) and least noticeable along the minimum acuity or Q axis (bluish red color).

2. Description of the Prior Art

In the prior art, attempts have been made to minimize the effects of transmitted phase errors between the synchronizing signal and the chrominance signal by bringing all colors which are close to the I axis closer or onto the I axis. This means that all colors which are even close to skin color will appear skin color when the correction is being utilized. Most receivers have switches for including the correction or excluding the correction as desired.

In a copending application entitled "Preset Control System For A Color Television Receiver," Ser. No. 140,489, filed May 5, 1971 and assigned to the same assignee, a hue correction system is described wherein the phase of the synchronizing signal applied to the red and blue color demodulators is altered to increase the angle between the red and blue color demodulators and, thereby, reduce the amplitude of the color components along the Q axis while increasing the amplitude of the color components along the I axis. While this system operates to provide better skin colors and adjacent colors, it has a tendency to reduce the greens.

SUMMARY OF THE INVENTION

The present invention pertains to apparatus and method for sensing the occurrence of color components along a predetermined axis and for altering the phase of the synchronizing signal applied to at least two of the color demodulators to alter the operating angles of the color demodulators, relative to the synchronizing signal, so that flesh tones are accentuated when present and greens are accentuated when flesh tones are not present.

It is an object of the present invention to provide an improved automatic hue control.

It is a further object of the present invention to provide apparatus and method of accentuating flesh tones when present and rendering greens normal when flesh tones are not present.

It is a further object of the present invention to provide a demodulator for I axis components of the chrominance signal, the output of which is utilized to control the phase of the signal from the subcarrier oscillator applied to the red and blue demodulators.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
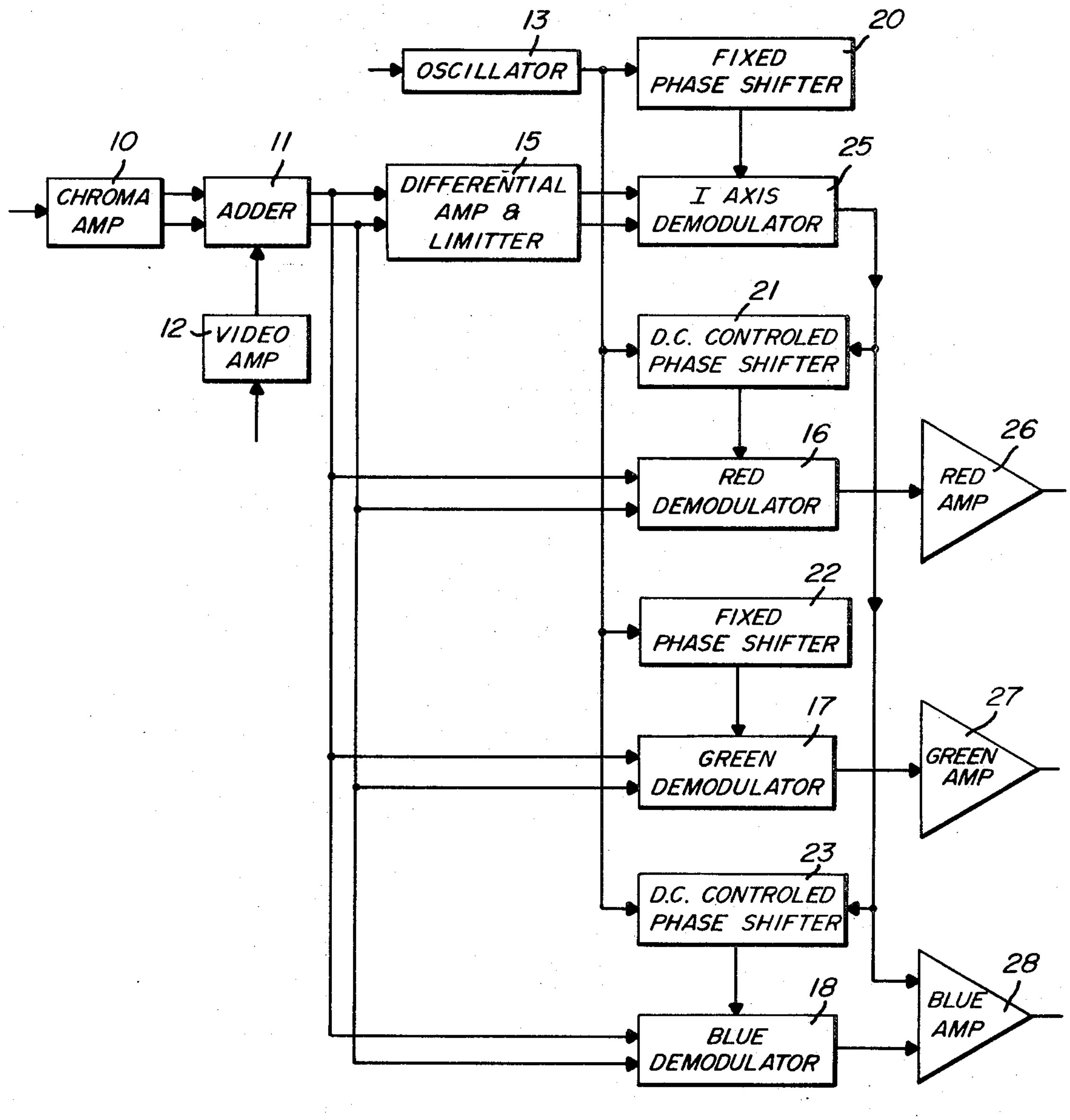
FIG. 1 is a block diagram of the chrominance channel in a three-color television receiver incorporating an embodiment of the present invention.

Referring to FIG. 1, a portion of a three-color television receiver is illustrated, it being understood that the portions not shown are standard and well known to those skilled in the art. As is well known to those skilled in the art, a television receiver receives a composite signal including a chrominance or color signal, a luminance or video signal and a synchronizing or burst signal (as well as sound and vertical and horizontal sweep information which will not be discussed in this application). In FIG. 1 the chrominance signal is applied to a chrominance amplifier 10 which further applies it to an adder 11. The luminance or video signal is applied to a video amplifier 12 which further applies it to the adder 11. The synchronizing or burst signal is applied to a subcarrier oscillator 13 to synchronize the oscillator 13 at the correct frequency and phase. While the present television receiving system is the type wherein the luminance and chrominance signals are combined, it should be understood that the present invention can also be incorporated in any of the well known systems wherein the luminance and chrominance signals are matrixed before or in the CRT.

The output signal from the adder 11 is applied to a differential amplifier and limiter 15, a red chrominance component demodulator 16, a green chrominance component demodulator 17 and a blue chrominance component demodulator 18. The synchronized output signal of the oscillator 13 is applied to a fixed phase shifter 20, a DC controlled phase shifter 21, a second fixed phase shifter 22 and a second DC controlled phase shifter 23. The fixed phase shifters 20 and 22 provide a reference signal at the output thereof which has a predetermined phase relative to the synchronizing signal applied to the oscillator 13. The DC controlled phase shifters 21 and 23 supply a reference signal which is alterable in phase relative to the synchronizing signal by supplying a signal at a phase adjusting input thereto. The fixed phase shifter 20 supplies a reference signal to an I axis demodulator 25 which in turn supplies a signal to the phase adjusting inputs of the DC controlled phase shifters 21 and 23 and to an input of a blue component amplifier 28. The DC controlled phase shifter 21 supplies a reference signal to the red component demodulator 16 which supplies a component of the chrominance signal to a red component amplifier 26. The fixed phase shifter 22 supplies a reference signal to the green component demodulator 17 which supplies a component of the chrominance signal to a green component amplifier 27. The DC controlled phase shifter 23 supplies a reference signal to the blue component demodulator 18 which in turn supplies a component of the chrominance signal to the blue component amplifier 28.

It is well known in the art that the chrominance signal can be represented by a rotating vector, the angle of which determines the hue or color and the magnitude of which determines the amount of the color. In this vector diagram it is relatively standard to represent the function (B-Y) as zero degrees, or extending along the abscissa, and the function (R-Y) as 90°, or extending along the ordinate. The synchronizing signal (burst or output signal from the oscillator 13) has a phase of 180°, or opposite the function (B-Y). The functions Q and I (the axis of least acuity and the axis of greatest acuity, respectively) are positioned at 33° and 123°, respectively. The colors red, green and blue lie at 103 degrees, 241 degrees and 347 degrees, respectively. Throughout this description it should be understood that the red, blue and green components refer to signals which will eventually be applied to red, blue and green guns of at least one CRT and do not apply to the red, blue and green color angles described above. This vector diagram will be utilized to explain the operation of the circuitry illustrated in block form in FIG. 1.

In an uncompensated television receiver a zero phase angle reference signal is applied to the blue component demodulator to provide a chrominance component therefrom lying at zero degrees on the vector diagram. A 90° phase shifted reference signal is applied to the red component demodulator to provide a chrominance component lying at 90° and a 241° phase shifted reference signal is applied to the green component demodulator to provide a chrominance component at 241°. These angles result in a substantially circular demodulation curve, or a substantially equal demodulation of the chrominance signal regardless of the angle thereof.

In the circuitry illustrated in FIG. 1 the fixed phase shifter 20 shifts the synchronous signal from the oscillator 13 from 180° to 123° so that the demodulator 25 provides a component of the chrominance signal lying along the I axis at 123°. When the output of the demodulator 25 is zero, the DC controlled phase shifter 21 shifts the synchronous signal from the oscillator 13 from 180° to something less than 90°, and preferably about 85 degrees. The DC controlled phase shifter 23 shifts the synchronous signal from the oscillator 13 from 180° to something greater than zero degrees, and approximately 5 degrees. The fixed phase shifter 22 shifts the synchronous signal from the oscillator 13 from 180° to 241°. Thus, the red and blue axes are spaced apart less than 90° and the demodulation curve is somewhat elliptical along the 61° (magenta) – 241° (green) axis so that greens and magentas are accentuated with no I components of the chrominance signal present.

When a component of the chrominance signal is present along the I axis, the I axis demodulator 25 provides a DC signal which is applied to the DC controlled phase shifters 21 and 23. Because the chrominance signal is applied through the differential amplifier and limiter 15 to the I axis demodulator 25, the amplitude of the component lying along the I axis, once a predetermined minimum is exceeded, does not alter the amplitude of the output signal from the I axis demodulator 25. With a DC signal present at the phase adjusting input of the phase shifters 21 and 23, the reference signal output from the phase shifter 21 is shifted to something greater than 90°, approximately 115 degrees, and the reference signal output from the phase shifter 23 is shifted to something less than 0°, approximately 345°. Thus, the angle between the chrominance components provided by the red and blue demodulators 16 and 18 is greater than 90° and the demodulation curve becomes elliptical about the plus and minus I axis. An elliptical demodulation curve about the I axis causes the skin colors to be accentuated and the greens and magentas to be greatly reduced. While the present embodiment is constructed so that chrominance components along a specific axis are sensed and switching occurs in response thereto, it should be understood that chrominance components along other or additional axes might be sensed and different amounts of phase shift might be introduced into the reference signals.

The angles for the vectors of the various color components described above are mathematical and do not correspond with the actual color (vector angles) of the red, blue and green electron guns in the CRT. Thus, when the red and blue demodulators, operating at a shifted phase angle, provide signals, which mathematically combine to produce a vector at approximately 123°, the application of these signals to the red and blue electron guns may produce a color with a vector actually lying at approximately 135°. To compensate for this error some additional signal may be applied to either the red or blue electron guns. The vector sum of the mathematical vector and the additional signal will appear at the desired angle. If additional signal is added to the red electron gun the vector sum will generally have too large an amplitude, since the amplitude of the mathematical vector is already slightly large. However, is a small DC component is added to the signal at the blue amplifier 28 both the angle and the amplitude are corrected. Since this error is most noticeable at and around skin colors (the I axis) a portion of the output of the I axis demodulator 25 is applied to the blue amplifier 28. The DC component is present only when the I axis demodulator 25 provides an output and it adds a vector with a zero angle (angle of the blue electron gun) to the mathematical vector.

Figure 2:
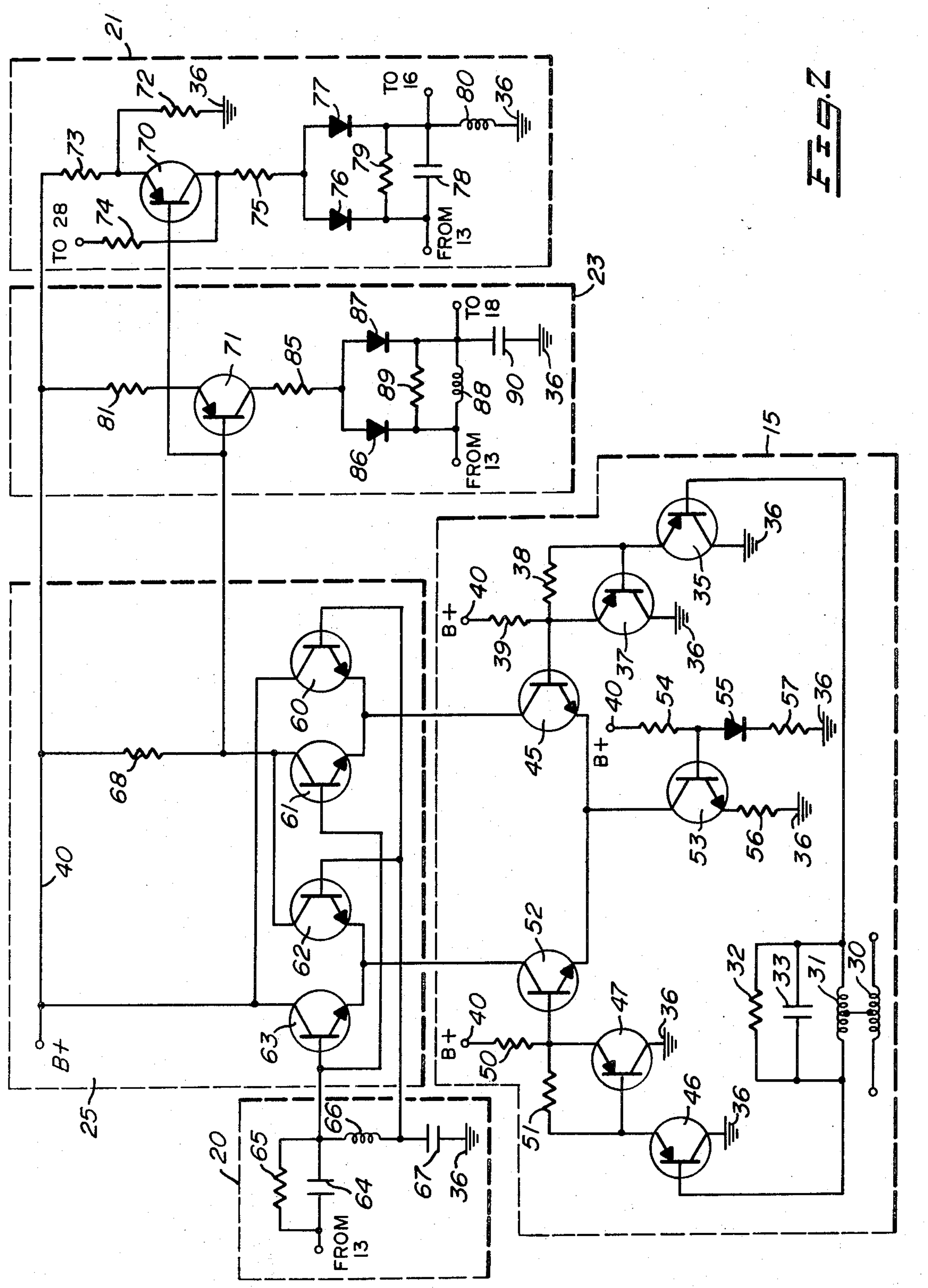
FIG. 2 is a schematic diagram of a portion of the apparatus illustrated in block form in FIG. 1.

Referring to FIG. 2, portions of the apparatus illustrated in block form in FIG. 1 are illustrated schematically. In the schematic diagram, the portions forming differential amplifier and limiter 15, fixed phase shifter 20, I axis demodulator 25, DC controlled phase shifter 21 and DC controlled phase shifter 23 are each enclosed in dotted lines to clarify the circuitry thereof. It should be understood that other circuits might be utilized by the one illustrated are chosen for simplicity and ease of manufacture. The remaining circuits illustrated in block form in FIG. 1 have not been included in the schematic diagram since they are all well known to those skilled in the art.

The chrominance signal from the adder 11 is applied across a tapped coil 30, the tap of which is connected to the tap of a second coil 31. A resistor 32 and a capacitor 33 are each connected in parallel with the coil 31. One end of the coil 31 is connected to the base of a PNP type transistor 35 the collector of which is grounded at 36 and the emitter of which is connected to the base of a second PNP type transistor 37. The emitter of the transistor 35 is also connected through a resistor 38 to the emitter of the transistor 37. The collector of the transistor 37 is grounded at 36. The emitter of the transistor 37 is also connected to a positive source of voltage 40 by a resistor 39. Further, the emitter of the transistor 37 is connected to the base of an NPN type transistor 45. The opposite side of the coil 31 is connected to the base of a PNP type transistor 46, the collector of which is connected to ground 36 and the emitter of which is connected to the base of a PNP type transistor 47. The collector of the transistor 47 is connected to ground 36 and the emitter is connected to the positive source of voltage 40 through a resistor 50, the base of the transistor 47 through a resistor 51, and the base of an NPN type transistor 52. The emitters of the transistors 45 and 52 are connected together and to the collector of an NPN type transistor 53, the emitter of which is connected to ground 36 through a resistor 56 and the base of which is connected to the positive source of voltage 40 through a resistor 54 and to the ground 36 through a series connected resistor 57 and forward biased diode 55.

The coils 30 and 31 and the associated circuitry form a bandpass filter circuit to allow only the desired signals to pass while the transistors 35, 37, 46 and 47 form a limiting circuit which operates only on a predetermined amplitude of voltage and thereafter is amplitude insensitive. The signals are supplied from the limiting circuit to the differential amplifier, transistors 45 and 52, with transistor 53 forming a current source in the emitter circuits. The collectors of the transistors 45 and 52 are the outputs for the differential amplifier and limiter 15.

The collector of the transistor 45 is connected to common emitters of a pair of NPN type transistors 60 and 61 and the collector of the transistor 52 is connected to common emitters of a pair of NPN type transistors 62 and 63. Transistors 60–63 and their associated circuitry form the I axis demodulator 25. The fixed phase shifter 20 includes a capacitor 64, one end of which is connected to the output of the oscillator 13 and the other end of which is connected to the common bases of transistors 61 and 63. A resistor 65 is connected in parallel with the capacitor 64. A series connected coil 66 and capacitor 67 are connected between the base of transistor 63 and the ground 36. The junction point of the coil 66 and capacitor 67 are connected to the base of transistor 60 and the base of transistor 62. The collectors of transistors 60 and 63 are connected directly to the positive source of voltage 40 and the collectors of the transistors 61 and 62 are connected to the positive source of voltage 40 through a resistor 68. The common collectors of the transistors 61 and 62 form the output of the I axis demodulator 25 and are connected to the base of a PNP type transistor 70 in the DC controlled phase shifter 21 and the base of a PNP type transistor 71 in the DC controlled phase shifter 23.

The emitter of the transistor 70 is connected to the junction between a pair of resistors 72 an 73, forming a voltage divider between the positive source of voltage 40 and ground 36. The collector of the transistor 70 is connected through a resistor 74 to an input of the blue amplifier 28 and through a resistor 75 to the anodes of a pair of diodes 76 and 77. A capacitor 78 and resistor 79 are connected in parallel between the cathodes of the diodes 76 and 77 with the cathode of the diode 76 being connected to receive the synchronous signal from the oscillator 13 and the cathode of the diode 77 being connected to supply the reference signal to the red component demodulator 16. A coil 80 connected between the cathode of the diode 77 and ground 36 completes the DC controlled phase shifter 21.

The emitter of the transistor 71 is connected to the junction of a pair of resistors 81 and 82, forming a voltage divider between the positive source of voltage 40 and ground 36. The collector of the transistor 71 is connected through a resistor 85 to the anodes of a pair of diodes 86 and 87. A parallel connected coil 88 and resistor 89 are connected between the cathodes of the diodes 86 and 87 with the cathode of the diode 86 connected to receive the output of the oscillator 13 and the cathode of the diode 87 connected to supply a reference signal to the blue component demodulator 18. A capacitor 90 connected between the cathode of the diode 87 and ground 36 completes the DC controlled phase shifter 23.

In the operation of the circuitry illustrated in FIG. 2, whenever a signal within the desired band of frequencies and of sufficient magnitude appears across the coil 31 one of the transistors 35 or 46 is biased into conduction (depending upon the polarity of the voltage across the coil 31). The conducting transistor 35 or 46 turns on the associated transistor 37 or 47, respectively, whereupon the collector thereof approaches ground potential and the transistor 45 or 52, respectively, is biased into nonconduction. The combination of the reference signal applied to the bases of the transistors 60–63 from the phase shifter 20 and the chrominance signal applied to the emitters by way of the collectors of transistors 45 and 52 produce a DC signal at the common collectors of transistors 61 and 62 which signal is representative of the I axis component of the chrominance signal. When a component of the chrominance signal is present along the I axis of the common collectors of transistors 61–62 drop to a lower voltage potential, which lower potential is applied to the common bases of transistors 70 and 71 to produce conduction therein. When transistor 70 conducts both diodes 76 and 77 are forward biased to provide a low resistance path to alternating current in parallel with the capacitor 78. This low resistance path in parallel with the capacitor 78 causes the synchronizing signal applied at the cathode of the diode 76 to be shifted in phase a lesser amount (from approximately 85° to approximately 115°). When transistor 71 conducts the diodes 86 and 87 are forward biased to provide a low resistance path in parallel with the coil 88 and alter the amount of phase shift of the synchronous signal applied at the cathode of the diode 86. With the diode 86 and 87 forward biased the synchronous signal is shifted to approximately 345°, as opposed to the 5 degree position of the reference signal when the diodes 86 and 87 are nonconducting.

Thus, circuitry is disclosed for providing a noncircular demodulation curve to enhance different hues only when the particular hues are present in the chrominance signal. For example, whenever a flesh tone or color near a flesh tone is present in the chrominance signal the phase of the red and blue demodulators is shifted to produce an elliptical demodulation curve about the I axis. An elliptical demodulation curve about the I axis compresses the color angles around the I axis so that small phase errors produce relatively small changes in color and are, therefore, unnoticeable. Similarly, when there are no components of the chrominance signal present along the I axis (or when the components are very small) the angle between the red and blue demodulator is decreased to produce an elliptical demodulation curve in the general direction of the green axis. Thus, greens are increased in amplitude and small phase errors are unnoticeable because color angles are compressed in the green area. While the blue, red and I axes are utilized in this embodiment for exemplary reasons, it should be understood that substantially any axes or combination of axes might be utilized in this invention.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. In a color television receiver adapted to receive a composite television signal including a synchronizing signal and a chrominance signal including a plurality of chrominance components, an improved automatic hue control comprising:

a. subcarrier oscillator means having an input for receiving the synchronizing signal and an output;

b. first variable phase shifting means coupled to said subcarrier oscillator and having a phase adjusting input, said first phase shifting means providing a reference signal having a predetermined phase relationship relative to the synchronizing signal and a different phase relationship relative to the synchronizing signal in response to a suitable signal at said phase adjusting input;

c. second variable phase shifting means coupled to said subcarrier oscillator and having a phase adjusting input, said second phase shifting means providing a reference signal having a predetermined phase relationship relative to the synchronizing signal and a different phase relationship relative to the synchronizing signal in response to a suitable signal at said phase adjusting input;

d. first color demodulator means coupled to receive the chrominance signal and the reference signal from said first phase shifting means, said first demodulator means providing a chrominance component along a first predetermined axis in response to the predetermined phase relationship of the reference signal and a chrominance component along a first shifted axis in response to the shifted phase relationship;

e. second color demodulator means coupled to receive the chrominance signal and the reference signal from said second phase shifting means, said second demodulator means providing a chrominance component along a second predetermined axis in response to the predetermined phase relationship of the reference signal and a chrominance component along a second shifted axis in response to the shifted phase relationship; and f. sensing means coupled to receive the chrominance signal and a reference signal from said subcarrier oscillator means for sensing the occurrence of a chrominance component along a third axis, said sensing means being coupled to the phase adjusting inputs of said first and second variable phase shifting means and providing a signal thereto for shifting the reference signals therefrom to the different phase relationships upon the amplitude of the chrominance component along the third axis reaching a predetermined value.

2. An improved automatic hue control as set forth in claim 1 wherein the sensing means includes third color demodulator means.

3. An improved automatic hue control as set forth in claim 1 wherein the first and second predetermined axes are separated by an amount less than 90° and the first and second shifted axes are separated by an amount greater than 90 degrees.

4. An improved automatic hue control as set forth in claim 3 wherein the third axis is located approximately in the skin color region of the chromaticity diagram, or the I axis.

5. An improved automatic hue control as set forth in claim 1 wherein the first color demodulator means includes a red demodulator, the second color demodulator means includes a blue demodulator and the sensing means includes an I axis demodulator.

6. An improved automatic hue control as set forth in claim 1 having in addition means for combining at least a portion of the signal from the sensing means with the chrominance component from the first demodulator means to adjust the angle of a resultant vector representation for the chrominance components along the first and second shifted axes.

7. An improved automatic hue control as set forth in claim 1 wherein the first variable phase shifting means includes an impedance connected between the output of the subcarrier oscillator and the first color demodulator means and a pair of oppositely poled diodes connected in series across said impedance with the junction of said diodes being the phase adjusting input and connected to the sensing means for altering the value of said impedance upon the application of a forward biasing electrical energy thereon.

8. In a color television receiver adapted to receive a composite television signal including a chrominance signal, an improved method of controlling the hue comprising the steps of:

a. demodulating the chrominance signal to provide at least red and blue components thereof along first and second predetermined axes;

b. sensing the amplitude of a component of the chrominance signal by demodulating the chrominance signal along the I axis; and c. shifting the demodulation of the chrominance signal, in response to the amplitude of the component along the I axis reaching a predetermined value, to provide two components of the chrominance signal along two shifted axes spaced from the first and second predetermined axes.

9. An improved method of controlling the hue as set forth in claim 8 wherein the two shifted axes are spaced apart by a greater angle than the two predetermined axes and the components of the chrominance signal are provided along the two shifted axes in response to a positive amplitude of the component of the chrominance signal along the third axis.

10. An improved method of controlling the hue as set forth in claim 9 wherein the two shifted axes are spaced apart approximately 130° and the two predetermined axes are spaced apart approximately 80 degrees.

11. An improved method of controlling the hue as set forth in claim 8 including in addition the step of combining at least a portion of the component along the I axis with one of the two components along the shifted axes.

* * * * *